United States Patent
Tenenbaum et al.

[11] Patent Number: 6,144,022
[45] Date of Patent: Nov. 7, 2000

[54] RAIN SENSOR USING STATISTICAL ANALYSIS

[75] Inventors: Jeff Tenenbaum, West Bloomfield; Peter A. Hochstein, Troy, both of Mich.

[73] Assignee: Valeo Electrical Systems, Inc., Auburn Hills, Mich.

[21] Appl. No.: 09/268,387

[22] Filed: Mar. 15, 1999

[51] Int. Cl.[7] .............................. B60S 1/08; G05B 5/00
[52] U.S. Cl. ...................... 250/208.1; 250/573; 318/483; 318/DIG. 2; 15/DIG. 15
[58] Field of Search ................................ 250/208.1, 573; 318/483, DIG. 2; 15/DIG. 15; 340/602

[56] References Cited

U.S. PATENT DOCUMENTS 5,923,027   7/1999   Stam et al. ............................ 250/208.1
6,020,704   7/1999   Burshur .................................. 318/483

FOREIGN PATENT DOCUMENTS 9-189533   7/1997   Japan .

Primary Examiner—F. L. Evans
Attorney, Agent, or Firm—Howard & Howard

[57] ABSTRACT

A method and an assembly for sensing moisture (20) on the exterior surface (22) of a sheet of glass (14) by positioning an imaging lens (16) adjacent to the interior surface (18) of the sheet of glass (14), passing light rays from moisture (20) on the exterior surface (22) of the sheet of glass (14) through the imaging lens (16) and producing first and second successive images of the moisture (20) on the glass (14), and successively directing the first and second images from the lens (16) onto a focal plane detector (12). The focal plane detector (12) is divided into rows of pixels (24) which are ligned into columns. The assembly and method are characterized by scanning the pixels (24) of each row in a first scan (FIG. 4) and producing a reference value X for each pixel (24) in response to an initial image in that pixel (24), scanning the pixels (24) of each row in a second scan (FIG. 5) and producing a subsequent value Y different from the reference value in response to an subsequent image in that pixel (24). A correlation coefficient value r is developed for each row with a statistical formula from the reference and subsequent values to produce a wiper signal in response to the correlation coefficient value r deviating from a predetermined value. An additional condition to the wiper signal could be that the correlation coefficient values r differ from row to row.

14 Claims, 5 Drawing Sheets

PIXEL COLUMN NUMBER

| | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| 0 | 0 | 1 | 1 | 1 | 1 | 1 | 1 | 1 | 1 | 1 | 1 | 1 | 1 | 1 | 1 | 1 | 1 | 1 | 1 | 1 |
| 1 | 0 | 1 | 9 | 1 | 1 | 1 | 1 | 1 | 9 | 1 | 1 | 1 | 1 | 1 | 1 | 1 | 1 | 1 | 1 | 1 |
| 2 | 0 | 1 | 1 | 1 | 1 | 1 | 1 | 1 | 1 | 1 | 1 | 1 | 1 | 1 | 1 | 1 | 1 | 1 | 1 | 1 |
| 3 | 0 | 1 | 1 | 1 | 1 | 1 | 1 | 1 | 1 | 1 | 1 | 1 | 1 | 1 | 1 | 1 | 9 | 1 | 1 | 1 |
| 4 | 0 | 1 | 1 | 1 | 1 | 1 | 1 | 1 | 1 | 1 | 1 | 1 | 1 | 1 | 1 | 1 | 1 | 1 | 1 | 1 |
| 5 | 0 | 1 | 1 | 1 | 1 | 1 | 1 | 1 | 1 | 1 | 1 | 1 | 1 | 1 | 1 | 1 | 1 | 1 | 1 | 1 |
| 6 | 0 | 1 | 1 | 1 | 1 | 1 | 1 | 1 | 1 | 9 | 1 | 1 | 1 | 1 | 1 | 1 | 1 | 1 | 1 | 1 |
| 7 | 0 | 1 | 1 | 1 | 1 | 1 | 1 | 1 | 1 | 1 | 1 | 1 | 1 | 1 | 1 | 1 | 1 | 1 | 1 | 1 |
| 8 | 0 | 1 | 1 | 1 | 1 | 1 | 1 | 1 | 1 | 1 | 1 | 1 | 1 | 1 | 1 | 1 | 1 | 1 | 1 | 1 |
| 9 | 0 | 1 | 1 | 1 | 1 | 1 | 1 | 1 | 1 | 1 | 1 | 1 | 1 | 1 | 1 | 1 | 1 | 1 | 1 | 1 |

PIXEL ROW NUMBER

FIG - 6

PIXEL COLUMN NUMBER

| | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| 0 | 0 | 1 | 1 | 1 | 1 | 1 | 1 | 9 | 9 | 9 | 1 | 1 | 1 | 1 | 1 | 1 | 1 | 1 | 1 | 1 |
| 1 | 0 | 1 | 9 | 9 | 1 | 1 | 1 | 9 | 9 | 9 | 1 | 1 | 1 | 1 | 1 | 1 | 1 | 1 | 1 | 1 |
| 2 | 0 | 1 | 9 | 9 | 1 | 1 | 1 | 9 | 9 | 9 | 1 | 1 | 1 | 1 | 1 | 1 | 1 | 1 | 1 | 1 |
| 3 | 0 | 1 | 1 | 1 | 1 | 1 | 1 | 1 | 1 | 1 | 1 | 1 | 1 | 1 | 1 | 1 | 9 | 9 | 1 | 1 |
| 4 | 0 | 1 | 1 | 1 | 1 | 1 | 1 | 1 | 1 | 1 | 1 | 1 | 1 | 1 | 1 | 1 | 9 | 9 | 1 | 1 |
| 5 | 0 | 1 | 1 | 1 | 1 | 1 | 1 | 1 | 1 | 1 | 9 | 9 | 9 | 1 | 1 | 1 | 1 | 1 | 1 | 1 |
| 6 | 0 | 1 | 1 | 9 | 9 | 9 | 1 | 1 | 1 | 1 | 9 | 9 | 9 | 1 | 1 | 1 | 1 | 1 | 1 | 1 |
| 7 | 0 | 1 | 1 | 9 | 9 | 9 | 1 | 1 | 1 | 1 | 9 | 9 | 9 | 1 | 1 | 1 | 1 | 1 | 1 | 1 |
| 8 | 0 | 1 | 1 | 9 | 9 | 9 | 1 | 1 | 1 | 1 | 1 | 1 | 1 | 1 | 1 | 1 | 1 | 1 | 1 | 1 |
| 9 | 0 | 1 | 1 | 1 | 1 | 1 | 1 | 1 | 1 | 1 | 1 | 1 | 1 | 1 | 1 | 1 | 1 | 1 | 1 | 1 |

PIXEL ROW NUMBER

FIG - 7

RAIN SENSOR USING STATISTICAL ANALYSIS

RELATED APPLICATION

This application is an improvement to the invention disclosed in co-pending application Ser. No. 09/262,411 filed Mar. 4, 1999, and an alternative to the invention disclosed in co-pending application Ser. No. 09/267,867 filed Mar. 12, 1999, both assigned to the assignee of the subject invention.

BACKGROUND OF THE INVENTION

1. Field of the Invention

The subject invention relates to an assembly for sensing moisture on a sheet of glass and, more particularly, to a rain sensor for detecting rain on the windshield of an automotive vehicle to turn on the wipers.

2. Description of the Prior Art

The present invention relates to a method of analyzing the information developed by an off the glass imaging rain sensor. Optical rain sensing means as disclosed in the co-pending application mentioned above may be used to generate a digital image of rain drops, mist, water rivulets and other artifacts that may appear on the outer surface of a vehicular windshield. In addition, these same imaging means may develop an 'image' of fog that may condense on the inner surface of a windshield under certain conditions. As described in the co-pending application, an optical lens, or reflector, forms a real image of the rain on a focal plane imaging array. Such arrays are well known for their use in digital imaging and in solid state T.V. cameras. Currently, two of the more common imaging array technologies are charge coupled devices [CCD] or complementary metal oxide semiconductor [CMOS] devices.

Typically, in digital imaging practice, the scanned image is composed of sequential pixels or image elements that are stored as a coherent image in some form of memory. That is, each pixel's luminance level is stored as a digital value in a memory location corresponding to its location in the image array. Naturally, in monochrome applications chromaticity information is not pertinent. However, even without chromaticity information the amount of digital storage and manipulation necessary for even moderate resolution images is very large. For example, a low cost imager with 160×120 pixel resolution would require over 25 Kbyte storage for each image frame, when the overhead of blank lines is factored in. At video framing rates of 30 Hz. the parallel video data streams at over 750 Kbytes per second, necessitating high speed, relatively costly processing.

Traditional image processing algorithms which include two dimensional edge detection, convolution, correlation and frequency transform algorithms are extremely memory and computationally intensive. These techniques are primarily used to recognize specific objects within an image. Common applications for such image analysis methods include counting biological cells of various types and for determining the number of inclusions in metallographic samples. Such image analysis is particularly useful when the image characteristics of the subject are well established and can be quantified. In applications where unknown artifacts may poison the image, traditional image analysis methods are less useful, and provisions have to be made to process and store such extraneous data in expensive non-volatile memory. For example, in a typical rains sensor application, chips and scratches in the windshield as well as non removable dirt would need to be identified as permanent artifacts that do not require wiping.

While traditional image analysis is characterized by the ability to recognize objects within one scanned image frame, or two at most, the computationally intensive algorithms that are necessary tend to make this approach rather expensive. There is clearly a need for image analysis that does not require full frame image storage and a need to reduce the computational requirements to a level available in low cost microcontrollers.

SUMMARY OF THE INVENTION AND ADVANTAGES

An assembly for sensing moisture on a glass surface from a position adjacent the glass comprising a focal plane detector adapted for disposition adjacent to the interior surface of the sheet of glass, an imaging lens adapted for disposition between the focal plane detector and the interior surface of the sheet of glass for directing light rays from moisture on the exterior surface of the sheet of glass through the imaging lens to produce successive first and second images of the moisture on said focal plane detector. A plurality of pixels for divide the images into a plurality of elements. The assembly is characterized by a controller for scanning the elements in a first scan and producing a reference integer for each element in response to an initial or unobstructed image in that element, for scanning the elements in a second scan and producing a correlation integer different from the reference integer in response to a subsequent or an obstructed image in that element, for developing a correlation coefficient value from the reference and correlation integers, and for producing a wiper signal in response to the correlation coefficient value deviating from a predetermined value.

The invention therefore includes a method for sensing moisture on the exterior surface of a sheet of glass comprising the steps of positioning an imaging lens adjacent to the interior surface of the sheet of glass, passing light rays from moisture on the exterior surface of the sheet of glass through the imaging lens, producing first and second successive images of the moisture on the glass, and successively directing the first and second images from the lens onto a focal plane detector, and dividing each of the images into a plurality of elements. The method is characterized by scanning the elements in a first scan and producing a reference integer for each element in response to an initial image in that element, scanning the elements in a second scan and producing a correlation integer different from the reference integer in response to a subsequent image in that element, developing a correlation coefficient value from the reference and correlation integers, and producing a wiper signal in response to the correlation coefficient value deviating from a predetermined value.

As a result of the invention, overall rain sensor cost can be reduced for several reasons. 1. Human factors studies conclusively established that as the rain droplets were reduced in size a far greater number, i.e., higher density, of droplets were required to initiate desired wiping. Since such fine droplets are generally evenly dispersed over a wide area, single pixel resolution was no longer required. Not only does this allow a lower cost, lower resolution imager to be used but simple image compression can be performed, limiting the number of unitary pixels needed for the algorithmic calculations. 2. Since the number of spurious artifacts in the image field are no longer of concern, because they are perfectly correlated in successive image fields, simple, low cost optics may be used. Furthermore, the imager is no longer as demanding in terms of even illumination. 3. When single dimensional algorithms are substituted for conventional two dimensional algorithms, the computational algorithms can be reduced by an order of magnitude. By carefully structuring the order of pixel processing, floating point arithmetic can be virtually reduced to zero. Elimination of floating point calculations dramatically reduces the memory and speed requirements of the microcontroller or DSP.

BRIEF DESCRIPTION OF THE DRAWINGS

Other advantages of the present invention will be readily appreciated as the same becomes better understood by reference to the following detailed description when considered in connection with the accompanying drawings wherein:

FIG. 6 is a schematic view of the array integers representing the images in the respective pixels for the first scan;

FIG. 7 is a schematic view of the array integers representing the images in the respective pixels for the second scan.

DETAILED DESCRIPTION OF THE PREFERRED EMBODIMENT

Figure 1:
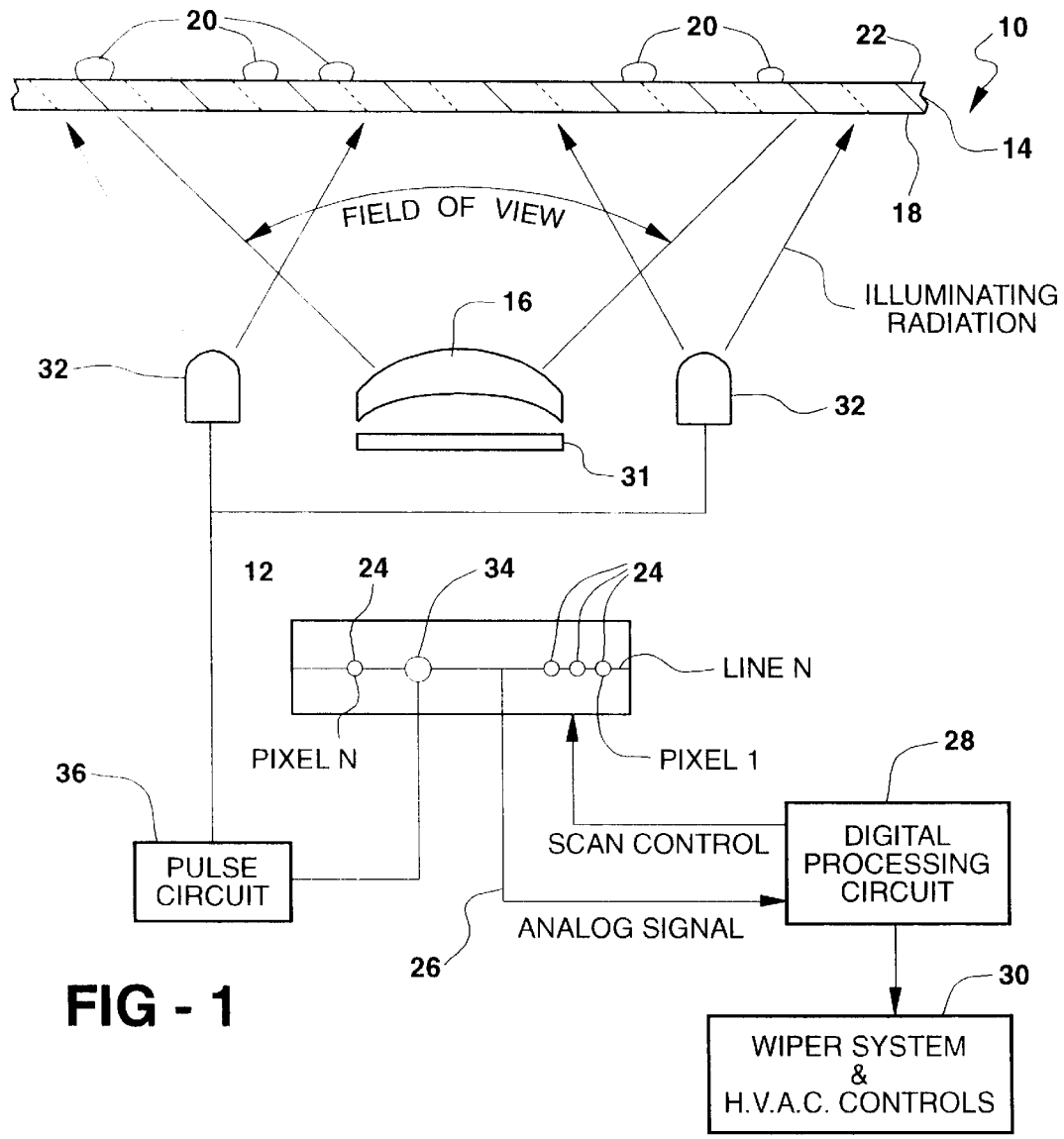
FIG. 1 is a schematic view of a preferred embodiment of the subject invention.

Referring to the Figures, wherein like numerals indicate like or corresponding parts throughout the several views, an assembly for sensing moisture on a glass surface from a position spaced from the glass is generally shown at 10 in FIG. 1. The assembly 10 includes, inter alia, a focal plane detector 12 adapted for disposition in spaced relationship to the interior surface 18 of a sheet of glass 14. The sheet of glass 14 is the windshield of an automotive vehicle. An imaging lens 16 is adapted for disposition between the focal plane detector 12 and the interior surface 18 of the sheet of glass 14 for directing light rays from moisture 20 on the exterior surface 22 of the sheet of glass 14 through the imaging lens 16 to produce successive first and second images of the moisture 20 on the focal plane detector 12.

The focal plane detector 12 comprises a plurality of pixels 24 for dividing the images into a plurality of elements and for producing an analog signal 26 corresponding to each of the elements.

An image control and detection processing circuit 28 is included for scanning the analog signals (26) digitizing same and forming a digital or establishing a digital reference image level of the analog signals 26 representing a non-moisture 20 condition of the exterior surface 22 of the glass 14 and for producing a wiper signal to the wiper system and the heater/vent & airconditioning controller 30 in response to a deviation from the reference image level. The non-moisture condition may, of course, be a condition where an minimal amount or an acceptable amount of moisture remains on the windshield. The wiper signal is a generic signal supplied to the wiper control and defrost or defog interface circuit 30 which, in turn, sends a signal to the wiper drive system and/or the heater, vent and air conditioning controls. In addition, the digital processing circuit 28 changes the digital reference image level in response to permanent changes in the non-moisture 20 condition of the exterior surface 22 of the glass 14. For example, the glass may become permanently scratched and after repeated indications of the new scratched condition the digital processing circuit 28 changes the threshold, digital reference image or steady-state level.

Ambient light can be used to illuminate the water droplets by transmissive means. Naturally ambient light can only be used in the daytime, and other provisions for lighting the water droplets on the windshield would be used at night. Low cost light emitting diodes (LEDs) operating at 880 nm (nanometers) or even 940 nm can be used singly or in an array to effectively illuminate the desired area of the windshield. The preferred assembly, therefore, includes a light source 32 adapted for disposition in spaced relationship to the interior surface 18 of the sheet of glass 14 for directing light to the exterior surface 22 of the glass 14 whereby light rays generated by the light source 32 are directed from moisture 20 on the exterior surface 22 of the sheet of glass 14 through the imaging lens 16 to produce the real image of the moisture 20 on the focal plane detector 12. In the preferred embodiment, the light source 32 comprises one or more light emitting diodes (LED). In addition, there is included an ambient light sensor 34 for sensing a predetermined level of ambient light for illuminating the LEDs 32 in response to the ambient light being below the predetermined level. The light sensor 34 includes a pulse circuit 36 for pulsing the light emitting diodes 32. Naturally, a narrow band filter 31 could be used to allow only the illuminating wavelengths to pass through to the detector 12, greatly improving the signal to noise ratio of the system. Pulsed LEDs operating at frequencies ranging from tens of Hz to several kHz may be used to improve discrimination of the illumination signal from ambient light.

Figure 2:
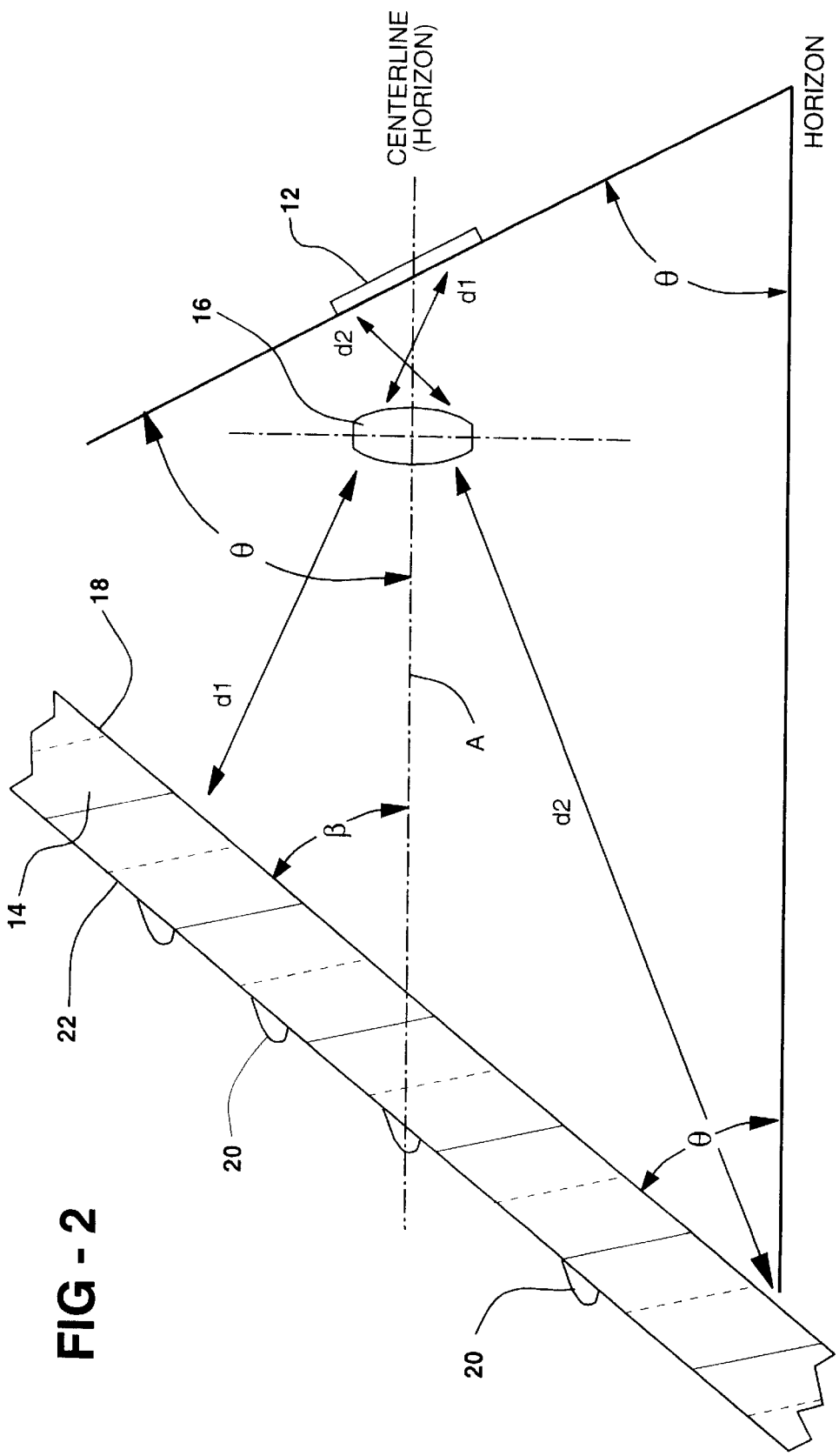
FIG. 2 is a schematic view of a species embodiment of the subject invention.

Normally, the lens 16, the focal plane detector 12 and the LEDs would be mounted on the forward side, i.e., windshield facing side, of the rearview mirror in an automobile. In so mounting, the lens 16 may be disposed at an acute angle $\Theta$ relative to the focal plane detector 12 for varying the magnification of the real image from one pixel 24 to another pixel 24. As illustrated in FIG. 2, the optical axis a of the lens 16 is positioned at an acute angle $\Theta$ relative to the plane of the focal plane detector 12 whereby the lens 16 may also be positioned at acute angle $\beta$ relative to the sheet of glass 14 to correct the image toward remaining in focus throughout the object field at the focal plane detector 12. Although, the image may be distorted dimensionally, focus will be maintained because the object plane slant angle $\beta$ will be compensated for by the acute angle $\Theta$ relationship between the lens 16 and the plane of the detector 12.

Figure 3:
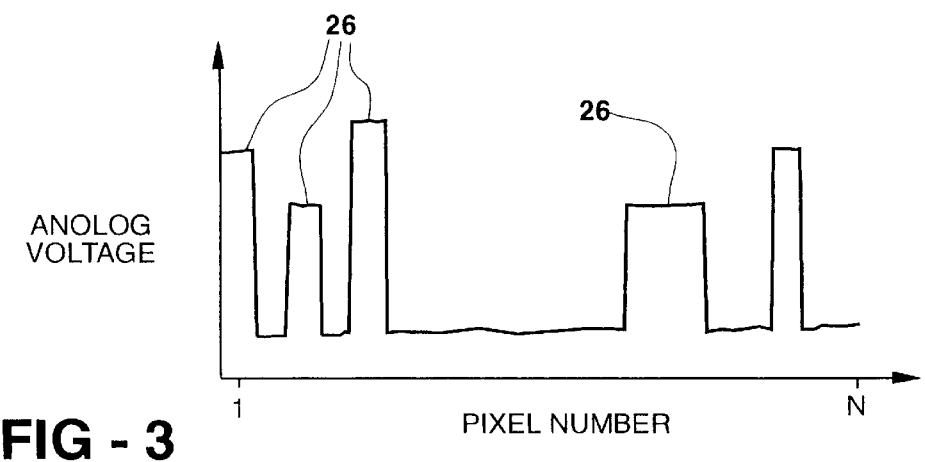
FIG. 3 is a graph of the analog signal produced by subject invention.

FIG. 3 shows the analog voltage on the Y or vertical axis and number N of pixels on the X or horizontal axis for one representative row of pixels in the imaging focal plane array. The peak positions in the graph represent the moisture drops effect upon the detected light signal. The recovered signal, whether from a single line photosensor array 12, such as a CCD or MOS sensor, or from a two dimensional imaging array of similar construction, will contain analog information relating to the transmission or reflection by individual drops of the illumination source. That is, individual pixel or image elements 24 in the photo detector array 12 will contain analog information corresponding to the brightness of certain parts of the image, which will be the retro-reflecting drops 20 attached to the glass surface 22 when illuminated by source 32.

The underlying principle of the invention is that artifacts in the image field, such as light changes, defects in the glass and irremovable dirt, change much more slowly over time than falling raindrops. Rather than trying to distinguish water droplets from artifacts, which traditional image processing would accomplish, the invention relies upon changes in successive first and second images to develop correlation coefficients r which are then weighed to effect a wiping signal. The use of image segmentation into elements or pixels 24 allows correlation coefficients r to be derived that are exceptionally sensitive to small image changes, while not requiring intensive pixel to pixel comparisons.

The application of Pearson's correlation coefficient, also referred to as product moment, is common to statistical sampling methods, and it may be used to determine the correlation of two variables. The Pearson coefficient may vary between −1 and +1. A coefficient of 0 indicates that neither of the two variables can be predicted from the other by a linear equation, while a correlation of +1 or −1 indicates that one variable may be perfectly predicted by a linear function of the other. As applied to optical rain sensing, the use of the Pearson coefficient allows features that are well correlated in successive image frames to be eliminated, thereby greatly truncating the storage and calculating requirements. A more detailed discussion of the Pearson coefficient may be found in *McGraw-Hill Encyclopedia of Science and Technology, 6th Edition, Vol. 17.*

It is readily apparent that by reducing the 19,200 pixel image to only 16 segments with correlation values between 1 and 0, the numerical overhead is dramatically simplified. The decision to enable the wipers and/or to activate the HVAC system is based on various templates and historical data, that are empirically determined.

Figure 4:
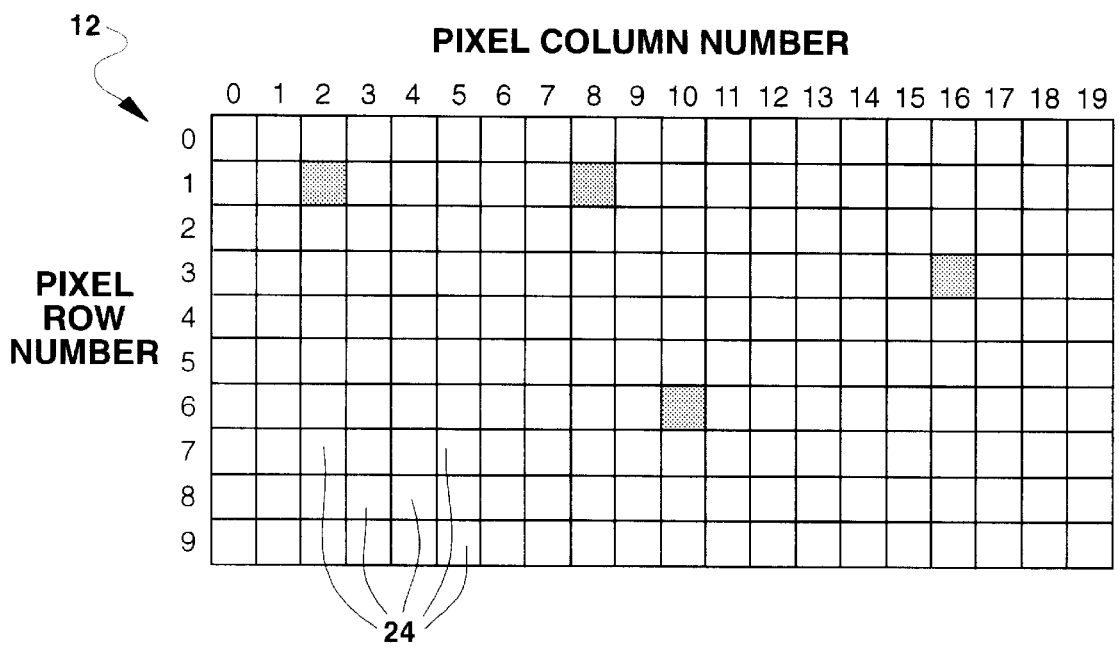
FIG. 4 is a schematic view of the array of pixels with pixels having an artifact in its image shown in black.
Figure 5:
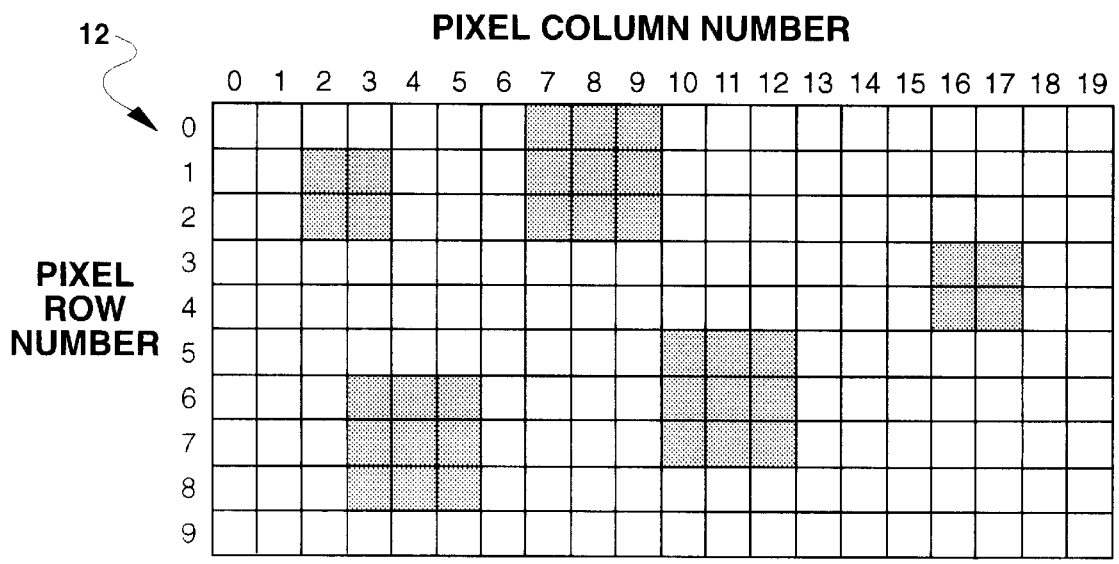
FIG. 5 is a schematic view of the array of pixels with pixels having the additional rain drops in its image shown in black.

For purposes of explanation and example, a simplified application of the Pearson correlation to rain sensing is diagramed in FIG. 4, which represents a focal plane detector 12. The representation is that of a two hundred pixel imager which comprises pixels 24 in an array of ten horizontal rows numbered zero through nine, the pixels 24 in all ten rows being aligned vertically in columns numbered zero through nineteen. In its simplest form there only need be first and second groups of pixels 24, which could be any two rows. As illustrated in FIG. 4, the black pixels 24 represent single pixel artifact images resulting from scratches on the glass, or the like. FIG. 5 illustrates blackened pixels 24 that have changed to multi-pixel images because of rain drop deposition. FIG. 6 represents the data matrix representations of the image pixels 24 or frames of FIG. 4 and FIG. 5 represents the data matrix representations of the image pixels 24 of FIG. 5. For purposes of simplicity, only fully white or black levels are noted.

In accordance with the method of the subject invention, light rays are passed from moisture 20 on the exterior surface 22 of the sheet of glass 14 through the imaging lens 16 to produce first (FIG. 4) and second (FIG. 5) successive images of the moisture 20 on the glass 14, and followed by successively directing the first and second images from the lens 16 onto a focal plane detector 12. Each of the images is divided into a plurality of elements or pixels 24.

The method is characterized by scanning the elements or pixels 24 in a first scan (FIG. 4) and producing an initial reference value for each element in response to an initial image in that element, scanning the elements in a second scan (FIG. 5) and producing a subsequent value different from the initial reference value in response to a subsequent image in that element, developing a correlation coefficient value r from the reference and subsequent values, and producing a wiper signal 30 in response to the correlation coefficient value deviating from a predetermined value. Although various statistical formulas may be utilized, it has been most advantageous to use the following Pearson correlation coefficient in developing the correlation coefficient value r:

$$r = \frac{\sum XY - \frac{\sum X \sum Y}{N}}{\sqrt{\left(\sum X^2 - \frac{(\sum X)^2}{N}\right)\left(\sum Y^2 - \frac{(\sum Y)^2}{N}\right)}}$$

wherein X equals the reference value, Y equals the subsequent value, and N equals the number of elements 24. As illustrated in FIGS. 6 and 7, the reference value is the numeral one (1) and the subsequent value is the highest single digit nine (9), but could be any digit different from the reference integer. To prevent a divide by zero from occurring in the formula, leading reference and subsequent values in each row may be artificially 'seeded' with a given zero value.

By comparing FIGS. 6 and 7 (which represent the first and second successively scanned images) it is immediately apparent that the pixels 24 which have not changed from the first image of FIG. 4 to the image of FIG. 5 exhibit a correlation coefficient r of one while the pixels 24 that have changed slightly have a correlation coefficient of close to zero.

A correlation coefficient value r is developed for each row and the Pearson coefficient correlations developed in accordance with the above formula for each of the respective rows for the pixels 24 for the images noted in FIGS. 4 and 5, are:

| ROW | CORRELATION COEFFICIENT VALUE r |
|---|---|
| 0 | r = 0.170925 |
| 1 | r = 0.587346 |
| 2 | r = 0.193384 |
| 3 | r = 0.696216 |
| 4 | r = 0.165461 |
| 5 | r = 0.170925 |
| 6 | r = 0.370480 |
| 7 | r = 0.207430 |
| 8 | r = 0.170925 |
| 9 | r = 1. |

Figure 8:
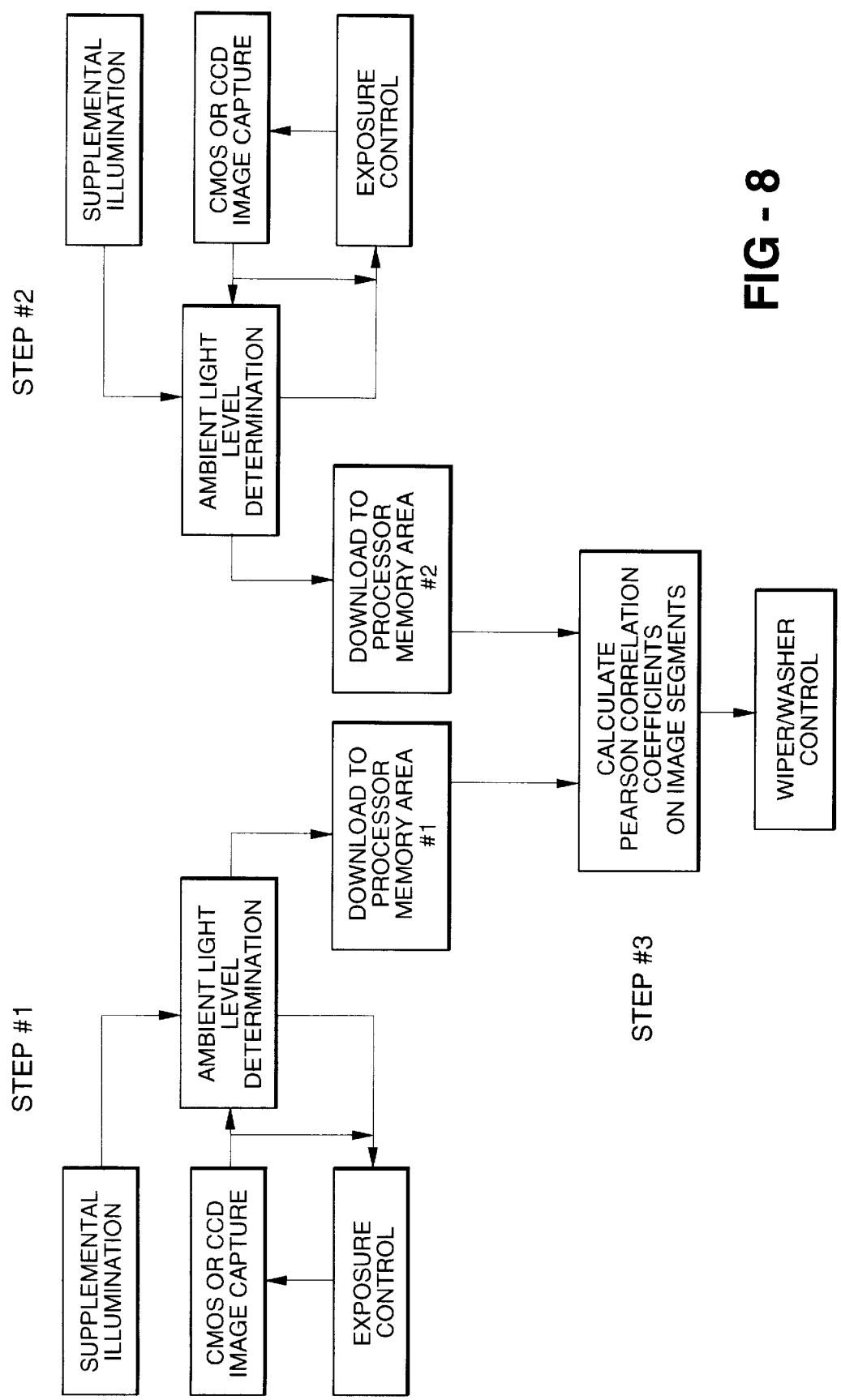
FIG. 8 is a block diagram of the subject invention.

A typical wipe algorithm might require over 50% of the row coefficients r to be below 0.2 before a wipe command is generated. A block diagram of a correlation based rain detection assembly is shown in FIG. 8. All of the blocks are software functions that would run on a dedicated microcontroller or DSP 28. The CMOS or CCD image sensors 12 may be used in autoexposure mode or they may optionally be controlled by a resident exposure control program. Therefore, the controller 28 of the assembly includes a storage unit for storing the statistical formula:

$$r = \frac{\sum XY - \frac{\sum X \sum Y}{N}}{\sqrt{\left(\sum X^2 - \frac{(\sum X)^2}{N}\right)\left(\sum Y^2 - \frac{(\sum Y)^2}{N}\right)}}$$

wherein X equals the initial reference value, Y equals the subsequent value, and N equals the number of pixels 24, and develops the correlation coefficient value r in accordance with this statistical formula.

The method of the subject invention is further defined as dividing the plurality of pixels 24 into first and second groups or rows, developing a first correlation coefficient r value for the first row, developing a second correlation coefficient value r for the second row, and producing a wiper signal 30 in response to either of the first and second correlation coefficient values deviating from said predetermined value, e.g., the below 0.2 mentioned above. An additional condition is that the correlation coefficients from row to row differ from each other before sending a wiper signal.

An example of the signal processing employed by the invention follows: As four bit pixel luminance data flows row by row, serially from the image sensor array 12, relatively coarse or super pixels are created. In one embodiment, forty single image pixels are summed to create one coarse pixel. A 160×120 pixel frame would be divided into sixteen rows each consisting of thirty coarse pixels 24. That is, the image resolution has been apparently reduced by a factor of forty, but as will be seen, there is virtually no consequent loss of sensitivity. In order to compare two subsequent scans, a thirty bit Pearson correlation computation is performed on each of the sixteen corresponding rows in those two successive image scans.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A method for sensing moisture (20) on the exterior surface (22) of a sheet of glass (14) comprising the steps of;
    positioning an imaging lens (16) adjacent the interior surface (18) of the sheet of glass (14),
    passing light rays from moisture (20) on the exterior surface (22) of the sheet of glass (14) through the imaging lens (16) and producing first and second successive images of the moisture (20) on the glass (14), and
    successively directing the first and second images from the lens (16) onto a focal plane detector (12),
    dividing each of the images into a plurality of elements (24),
    said method characterized by scanning the elements in a first scan and producing an initial reference value for each element in response to an initial image in that element, scanning the elements in a second scan and producing a subsequent value different from the initial reference value in response to an initial image in that element, developing a correlation coefficient value from the reference and subsequent values, and producing a wiper signal in response to the correlation coefficient value deviating from a predetermined value.

2. A method as set forth in claim 1 further defined as developing the correlation coefficient value in accordance with a statistical formula.

3. A method as set forth in claim 1 further defined as developing the correlation coefficient value (r) in accordance with the following statistical formula:

$$r = \frac{\sum XY - \frac{\sum X \sum Y}{N}}{\sqrt{\left(\sum X^2 - \frac{(\sum X)^2}{N}\right)\left(\sum Y^2 - \frac{(\sum Y)^2}{N}\right)}}$$

wherein X equals the reference value, Y equals the subsequent value, and N equals the number of elements (24).

4. A method as set forth in claim 1 further defined as dividing the plurality of elements into first and second groups, developing a first correlation coefficient value for the first group, developing a second correlation coefficient value for the second group, and producing a wiper signal in response to either of the first and second correlation coefficient values deviating from said predetermined value.

5. A method as set forth in claim 1 further defined as dividing the plurality of elements into first and second groups, developing a first correlation coefficient value for the first group, developing a second correlation coefficient value for the second group, and producing a wiper signal in response to either of the first and second correlation coefficient values deviating from said predetermined value and differing from each other.

6. A method as set forth in claim 5 further defined as placing the first and second groups in first and second rows, and leading the reference and correlation integers in each row with a zero.

7. A method as set forth in claim 6 further defined as aligning the elements of the first and second rows in columns.

8. An assembly for sensing moisture (20) on a glass (14) surface from a position adjacent the glass (14), said assembly comprising;
    a focal plane detector (12) adapted for disposition adjacent to the interior surface (18) of the sheet of glass (14), and
    an imaging lens (16) adapted for disposition between said focal plane detector (12) and the interior surface (18) of the sheet of glass (14) for directing light rays from moisture (20) on the exterior surface (22) of the sheet of glass (14) through said imaging lens (16) to produce successive first and second images of the moisture (20) on said focal plane detector (12),
    a plurality of pixels (24) for dividing the images into a plurality of elements,
    said assembly characterized by a controller (28) for scanning the elements in a first scan and producing a reference value for each element in response to an initial image in that element, for scanning the elements in a second scan and producing a subsequent value different from the reference value in response to a subsequent image in that element, for developing a correlation coefficient value from the reference and subsequent values, and for producing a wiper signal in response to the correlation coefficient value deviating from a predetermined value.

9. An assembly as set forth in claim 8 wherein said controller (28) includes a storage unit for storing a statistical formula and developing the correlation coefficient value in accordance with said statistical formula.

10. An assembly as set forth in claim 8 wherein said controller (28) includes a storage unit for storing the statistical formula:

$$r = \frac{\sum XY - \frac{\sum X \sum Y}{N}}{\sqrt{\left(\sum X^2 - \frac{(\sum X)^2}{N}\right)\left(\sum Y^2 - \frac{(\sum Y)^2}{N}\right)}}$$

wherein X equals the reference value, Y equals the subsequent value, and N equals the number of pixels (24), and developing the correlation coefficient value r in accordance with said statistical formula.

11. An assembly as set forth in claim 8 wherein the plurality of pixels are arranged into first and second groups for developing a first correlation coefficient value for the first group and for developing a second correlation coefficient value for the second group to producing a wiper signal in response to either of the first and second correlation coefficient values deviating from said predetermined value.

12. An assembly as set forth in claim 8 wherein the plurality of pixels are arranged into first and second groups for developing a first correlation coefficient value for the first group and for developing a second correlation coefficient value for the second group to producing a wiper signal in response to either of the first and second correlation coefficient values deviating from said predetermined value and differing from each other.

13. An assembly as set forth in claim 12 wherein the first and second groups are arranged in first and second rows, and including constant integer means for leading the reference and correlation integers in each row with a zero.

14. An assembly as set forth in claim 13 wherein the pixels of the first and second rows are aligned in columns.

* * * * *